United States Patent
Yamaguchi

[11] Patent Number: 6,058,202
[45] Date of Patent: *May 2, 2000

[54] METHOD OF DETERMINING EXPOSURE CONDITION OF PHOTOGRAPH

[75] Inventor: Hiroshi Yamaguchi, Kanagawa-ken, Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/726,358

[22] Filed: Oct. 4, 1996

[30] Foreign Application Priority Data

Oct. 6, 1995 [JP] Japan .......................................... 259964

[51] Int. Cl.$^7$ ............................. G06K 9/00; G01N 21/00; G01N 21/86
[52] U.S. Cl. ......................... 382/112; 382/168; 356/443; 250/559.02
[58] Field of Search ....................................... 382/168, 112, 382/167, 274, 170; 358/506, 302; 356/443, 444; 250/559.02, 564, 573, 574, 575, 576, 577; 396/569; 355/402, 101, 115; 399/47, 177; 348/221, 364

[56] References Cited

U.S. PATENT DOCUMENTS

| | | | |
|---|---|---|---|
| 3,690,765 | 9/1972 | Rickard et al. | 355/97 |
| 4,001,594 | 1/1977 | Akimoto et al. | 250/559.02 |
| 4,239,384 | 12/1980 | Treiber | 355/68 |
| 4,379,632 | 4/1983 | Dedden et al. | 355/68 |
| 4,657,378 | 4/1987 | Hope et al. | 355/38 |
| 4,679,087 | 7/1987 | Torrano, Jr. et al. | 348/673 |
| 4,901,152 | 2/1990 | Hieda et al. | 348/228 |
| 5,134,573 | 7/1992 | Goodwin | 364/525 |
| 5,194,946 | 3/1993 | Morikawa et al. | 358/505 |
| 5,224,177 | 6/1993 | Doi et al. | 382/168 |
| 5,436,979 | 7/1995 | Gray et al. | 382/141 |
| 5,475,493 | 12/1995 | Yamana | 356/404 |
| 5,568,270 | 10/1996 | Endo | 358/298 |
| 5,623,303 | 4/1997 | Inoue et al. | 348/96 |
| 5,661,518 | 8/1997 | Palm et al. | 348/42 |

FOREIGN PATENT DOCUMENTS

| | | |
|---|---|---|
| 3256035 | 11/1991 | Japan . |
| 5404944 | 4/1992 | Japan . |
| 6233052 | 6/1994 | Japan . |
| 6233052 | 8/1994 | Japan . |
| 2080556 | 2/1982 | United Kingdom . |

*Primary Examiner*—Edward L. Coles
*Assistant Examiner*—David Rosenblum

[57] ABSTRACT

A histogram of densities represented by image signal components of an image signal obtained by reading out an image from a photographic film is created. The density at a particular point on the histogram and the dynamic range of the image signal are obtained. It is determined that the photographic film was underexposed when the density of the particular point is smaller than a first predetermined density and at the same time the dynamic range of the image signal is smaller than a predetermined value, and that the photographic film was overexposed when the density of the particular point is larger than a second predetermined density and at the same time the dynamic range of the image signal is smaller than a predetermined value.

12 Claims, 4 Drawing Sheets

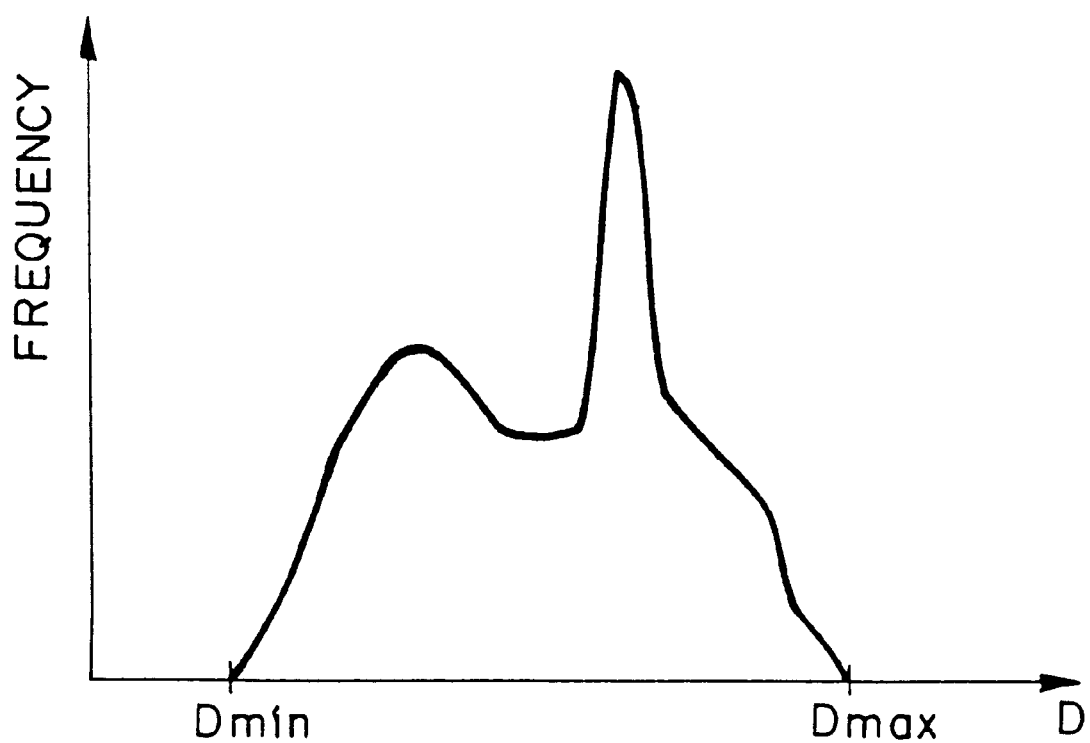
F I G. 3

METHOD OF DETERMINING EXPOSURE CONDITION OF PHOTOGRAPH

BACKGROUND OF THE INVENTION

1. Field of the Invention

This invention relates to a method for determining an exposure condition of a photograph based on an image signal obtained by reading out an image recorded on a photographic film or the like.

2. Description of the Related Art

Japanese Unexamined Patent Publication No. 6(1994)-233052, discloses a photographic printer which reads on an image recorded on a photographic film, obtains an image signal made up of image signal components representing densities of respective picture elements modulates a light beam according to the image signal and records an image on a photosensitive material by scanning the photosensitive material with the modulated light beam.

In such a photographic printer, images are read out both from properly exposed films and underexposed or overexposed films, and recorded on photosensitive materials. In an improperly exposed film, a photographic image is recorded on the film using non-linear portions of the film such as a "foot portion" or a "shoulder portion" of the characteristic curve of the film. Accordingly, when an image signal read out from an improperly exposed film is used as the basis for recording an image on the photosensitive material, contrast of the recorded image becomes unsatisfactory in a high density region or a low density region.

In order to overcome such a problem, image signals read out from improperly exposed films have been subjected to nonlinear conversion processing with characteristics inverse to the characteristics of the film, where an image is recorded on a photosensitive material based on the processed image signal. See, for instance, Japanese National-Publication of-translated-version No. 4(1992)-504944.

When carrying out such a nonlinear conversion processing, it is necessary to know the exposure condition (properly exposed, underexposed or overexposed) of the film from which the image signal was read out, that is, what range of the characteristic curve of the film was used upon taking a photograph. For this purpose, there is disclosed, in the patent publication identified above, a method in which the exposure condition of a photographic film is determined based on a comparison of the image signal with the base density of the film.

However, using this method for determining the exposure condition, each photographic printer must be provided with its own density measuring means since the base density must be actually measured film-by-film. Consequently, the cost of the printer is increased. Furthermore, this method introduces delays into the film developing process since it takes a long time to determine the exposure condition.

SUMMARY OF THE INVENTION

In view of the foregoing observations and description, the primary object of the present invention is to provide a method which makes it feasible to easily determine the exposure condition of a photographic film or the like from an image signal obtained by reading out an image from the photographic film or the like.

The method of the present invention comprises the steps of creating a histogram of densities represented by image signal components of an image signal obtained by reading out an image from a photographic film or the like, obtaining the density at a particular point (e.g., a point at which the signal level of the image signal is minimized or maximized) on the histogram and the dynamic range of the image signal, determining that the photographic film or the like was underexposed when the density of the particular point is smaller than a first predetermined density and at the same time the dynamic range of the image signal is smaller than a predetermined value, and determining that the photographic film or the like was overexposed when the density of the particular point is larger than a second predetermined density and at the same time the dynamic range of the image signal is smaller than a predetermined value.

When the densities represented by image signal components obtained from an image recorded on a photosensitive material are substantially small on the whole, there is a high probability that the photosensitive material was underexposed. By contrast, when the densities represented by image signal components obtained from an image recorded on a photosensitive material are substantially large on the whole, there is a high probability that the photosensitive material was overexposed.

Accordingly, it may be presumed that the photosensitive material is underexposed when the density of the particular point is smaller than a first predetermined density which is properly determined. Furthermore, it may be presumed that the photosensitive material is overexposed when the density of the particular point is larger than a second predetermined density which is properly determined. However, conclusive determinations of exposure condition based solely on such presumptions may be erroneous since the density at any particular point likely varies based on kind of the photosensitive material used (e.g., in the case of a photographic film, the density varies by the base density of the film).

On the other hand, when the dynamic range of an image signal obtained from an image recorded on a photosensitive material is large to a certain extent, there is a high probability that the photosensitive material was properly exposed using only the linear portion of the characteristic curve of the photosensitive material. By contrast, when the dynamic range is smaller than normal, there is a high probability that the photosensitive material was underexposed or overexposed, that is, the photograph was taken using non linear portions of the film such as a "foot portion" or a "shoulder portion" of the characteristic curve of the film, and accordingly the dynamic range was compressed.

Thus, by determining the exposure condition based on both the density at a particular point and the dynamic range of the image signal, underexposure or over exposure can be determined more accurately.

As can be understood from the description above, in accordance with the present invention, the exposure condition can be determined solely on the basis of an image signal, and accordingly the exposure condition can be determined in a short time without necessity of a means for measuring the base density of the film.

BRIEF DESCRIPTION OF THE DRAWINGS

FIG. 3 is a graph for illustrating a histogram of densities represented by image signal components of an image signal obtained in the photographic printer.

DESCRIPTION OF THE PREFERRED EMBODIMENT

Figure 1:
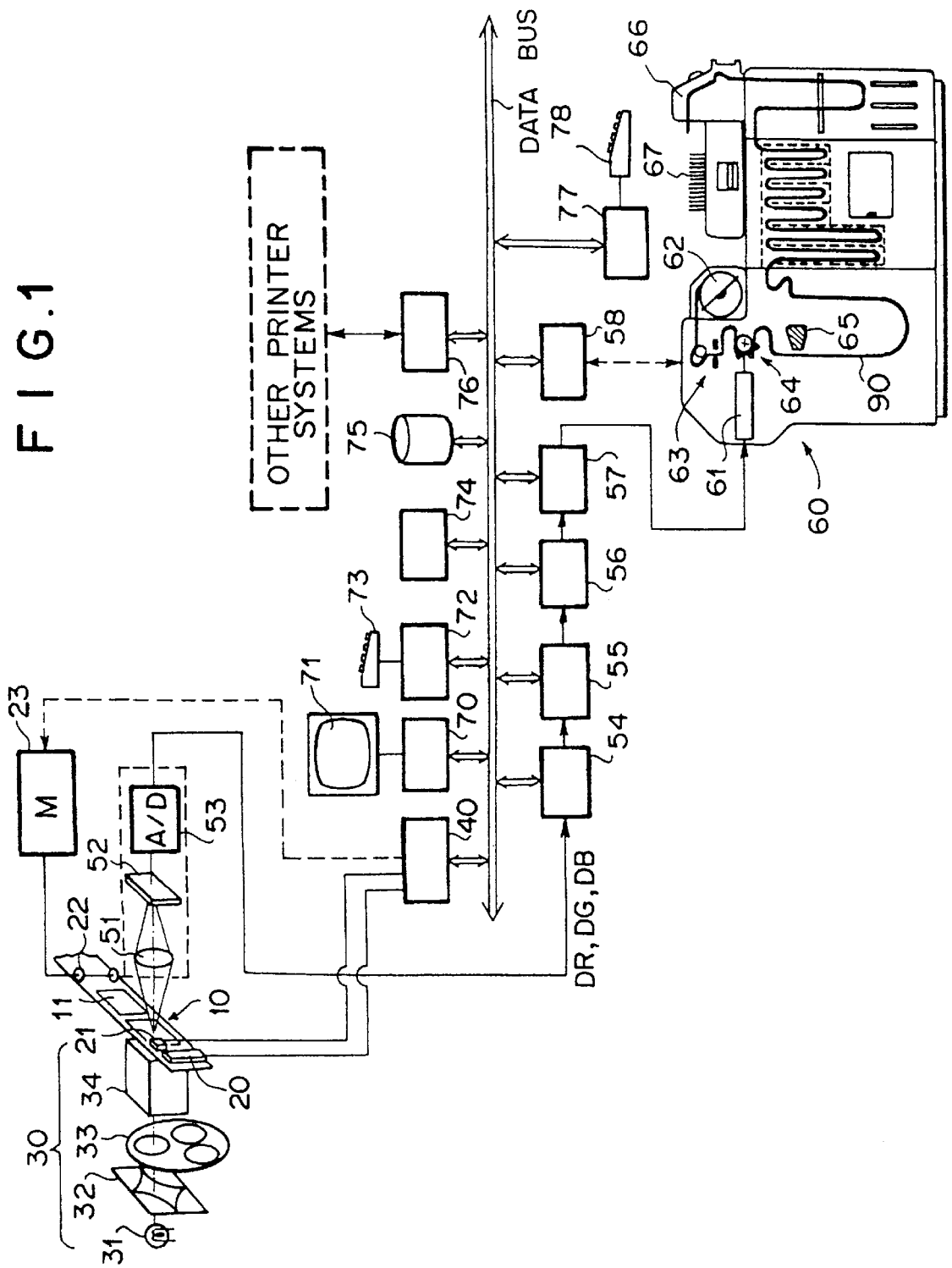
FIG. 1 is a schematic view of an example of a digital photographic printer for carrying out the method of the present invention.

In FIG. 1, a digital photographic printer is provided with a scanner 20 which reads out a film number recorded on a check tape applied to an end portion of color film 10, a bar code reader 21 which reads out a bar code for each of the exposures 11 of the film 10, a sprocket 22 which is in mesh with perforations of the film 10 and is rotated to feed the film 10, a motor 23 which drives the sprocket 22, and a film scanner control interface 40 which sends the film number read by the scanner 20 and the exposure number read by the bar code reader 21 to a data bus and outputs a motor control signal to the motor 23.

The photographic printer is further provided with a light source unit 30 which comprises a light source 31 which emits white light, a light control unit 32, a color separation unit 33 and a diffusion box 34 and which projects reading light onto the exposures 11 of the film 10, a CCD 52 which photoelectrically reads an image (transmission image) recorded on the exposure 11, onto which the reading light is projected, through a lens 51, an A/D convertor 53 which converts an image signal output from the CCD 52 to a digital image signal, a first image processing system 54 which carries out image processing on a digital image signal output from the A/D convertor 53 and outputs a processed image signal to a frame memory 55, a second image processing system 56 which carries out, image processing with a changed image processing parameter on the processed digital image signal stored in the frame memory 55 if necessary, and a modulator driver 57 which outputs a modulation signal on the basis of the processed digital image signal.

The photographic printer is further provided with a printer 60 which reproduces a visible image based on the modulation signal output from the modulator driver 57, a printer interface 58, a hard disk 75 which stores the digital image signal stored in the frame memory 55 by way of the data bus, a CRT monitor 71 which reproduces a visible image based on the digital image signal and displays image processing conditions and the like if necessary, a display interface 70, a keyboard 73 for inputting image processing conditions, corrections values for the image processing conditions, an image retrieval information and the like, a keyboard interface 72, a CPU (central processing unit) 74, a communication port 76 which is connected to other digital photographic printer systems through a communication line, a keyboard 78 which is disposed in a check section for checking photographic prints reproduced by the printer 60 and is for inputting, a reprint instruction if necessary, and a keyboard interface 77. The CPU 74 carries out mapping of the image retrieval information including the film number and the exposure numbers respectively read by the scanner 20 and the bar code reader 21, the image processing conditions input from the first image processing system 54 and the digital image signal input from the frame memory 55 and then stores them in the hard disk 75. Further, the CPU 74 retrieves and controls a digital image signal corresponding to image retrieval information input from the keyboard 73, and controls the instruments connected to the data bus.

The printer 60 comprises a printing section, a developing section and a drying section. The printing section comprises a magazine 62 which stores a roll of photographic paper 90 in a continuous length, an exposing light scanner 61 which modulates exposing light according to the modulation signal output from the modulator driver 57 and causing the modulated exposing light to scan the photographic paper 90 in a direction perpendicular to the longitudinal direction of the photographic paper 90 (main scanning), a hole punch unit 63 which punches out a reference hole in the photographic paper 90 for positioning the photographic paper 90, a sub-scanning drive system 64 which feeds the photographic paper 90 in the longitudinal direction thereof (sub-scanning) on the basis of the reference hole, and a back printing unit 65 which records the image retrieval information input through the printer control interface 58 on the back side of the photographic paper 90.

The drying section comprises a cutter 66 which cuts the exposed photographic paper 90 exposure-by-exposure after drying in order a sorter 67 which arranges in order the prints in order after they are cut from the exposed photographic paper 90 in a continuous length, and normal drying means (not identified by reference numeral).

Operation of the digital photographic paper will be described, hereinbelow. The CPU 74 first drives the motor 23 by way of the film scanner control interface 40, thereby feeding the film 10 by way of the sprocket 22. While the film 10 is fed, the film number on the check tape is read by the scanner 20 and input into the CPU 74 and the bar codes representing the number of the exposures 11 are read by the bar code reader 21 and input into the CPU 74 through the film scanner control interface 40.

The exposure 11, whose exposure number is represented by the bar code, is exposed to light from the light source unit 30, and the image on the exposure 11 is focused on the CCD 52 through the lens 51. The CCD 52 reads the image and the output signal of the CCD 52 is digitized by the A/D convertor 53, whereby a digital image signal made up of digital image signal components for the respective picture elements is obtained.

At this time, red, green and blue filters of the color separation unit 33 are inserted in sequence into the optical path of the light from the light source 31, and the CCD 52 reads the images for the respective filters. Accordingly, three digital image signals DR, DG and DB are obtained from the A/D converter 53, the three signals being made up of digital image signal components respectively representing the red, green and blue densities at the respective picture elements.

The first image processing system 54 carries out an inversion processing on the digital image signals DR, DG and DB input when they are obtained from a negative. Thereafter, the first image processing system 54 carries out image processing on the image signals according to a predetermined image processing algorithm when a visible image is reproduced on a photographic paper by use of the processed image signals DR, DG and DB, optimal density, gradation and sharpness can be obtained. Then the first image processing system 54 outputs the processed image signals to the frame memory 55.

Strictly speaking, the aforesaid image processing apparatus are not carried out directly on the digital image signals DR, DG and DB. Rather, these processes are performed on the digital image signals DR, DG and DB after those signals are subjected to a gray balance adjustment processing. However, the gray balance adjustment processing is not directly concerned with the present invention and accordingly will not be described here.

The image signals input into the frame memory 55 are stored therein and, at the same time, are input into the CPU 74 through the data bus. As such the CPU 74 is able to optimally adjust the dynamic range of the CCD 52 and the like and to optimally adjust the amount of light projected onto the film from the light source unit 30 on the basis of the image signals. Thus, the image read out is optimal in density and gradation.

The image signals stored in the frame memory 55 are input into the CRT monitor 71 through the data bus, and a visible image is displayed on the CRT monitor 71 on the basis of the image signals. Then the operator can input correction values for correcting the image processing conditions through the keyboard 73 so that a visible image optimal in density, gradation and color can be obtained.

The correction values input through the keyboard 73 are input into the second image processing system 56. The second image processing system 56 processes the image signals stored in the frame memory 55 based on the correction values and outputs the processed image signals to the modulator driver 57. Then correction is not necessary, the second image processing system 56 outputs the image signals stored in the frame memory 55 to the modulator driver 57 without change.

The printer 60 is controlled by the CPU 74 through the printer control interface 58. That is, the sub-scanning drive system 64 first feeds the photographic paper 90, extending along a predetermined path from the magazine 62, in the sub-scanning direction. The hole punch unit 63 provided on the path of the photographic paper 90 punches out reference holes for synchronization in a side edge portion of the photographic paper 90 at intervals corresponding to, for instance, a length of one photographic print. In the printer 60, the photographic paper 90 is fed with the reference holes used as a reference of synchronization.

The photographic paper is scanned by a light beam which is emitted from the exposing scanner 61 and is modulated according to the image signals while being fed in the sub-scanning direction, whereby a visible image is recorded on the photographic paper 90 according to the image signals. The speed for feeding the photographic paper 90 is controlled by the CPU 74 so that the main scanning and the sub-scanning are synchronized with each other.

Thereafter, the photographic paper 90 is fed to the developing section from the printing section along a predetermined path. After developed and washed in the developing section, the photographic paper 90 is fed to the drying section. In the drying section, the photographic paper 90 is dried and cut into prints by the cutter 66.

Figure 2A:
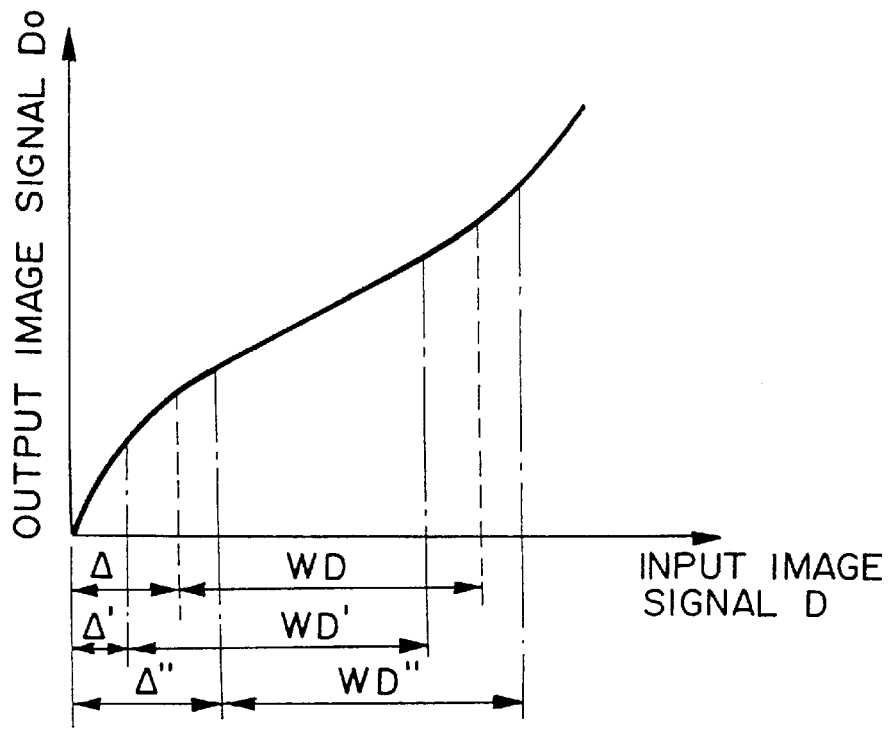
FIGS. 2A and 2B are graphs illustrating a nonlinear conversion in the digital photographic printer.

The first image processing system 54 carries out nonlinear conversion processing on the digital image signals DR, DG and DB, prior to the aforesaid image processings. In the nonlinear conversion processing, the input digital image signal D (DR, DG or DB) is converted into an output image signal Do according to nonlinear characteristics shown in FIG. 2A. The conversion characteristics shown in FIG. 2A is inverted relative to the amount of exposure-color forming density characteristics of the negative film 10 shown in FIG. 2B.

The nonlinear conversion processing will be described in more detail, hereinbelow. When the film 10 is properly exposed and the range of the amount of exposure is in the proper range indicated at WE in FIG. 2B, only the substantially linear portion of the characteristic curve of the film 10 is used. The color forming density range of the film 10, i.e., the range of the image signal D, at this time is the range indicated at WD.

By contrast, when the film 10 is underexposed and the range of the amount of exposure is in the range indicated at WE', a portion including the "foot portion" of the characteristic curve of the film 10 is used and the range of the image signal D is the range indicated at WD', whereby the dynamic range of the image signal D is compressed. When an image is recorded by use of such an image signal, the recorded image becomes poor in contrast in the low density region. When the image signal D obtained from an underexposed film is processed to uniformly enhance the contrast in order to overcome such a problem, the recorded image becomes unnaturally high in contrast in the middle density region.

Figure 2B:
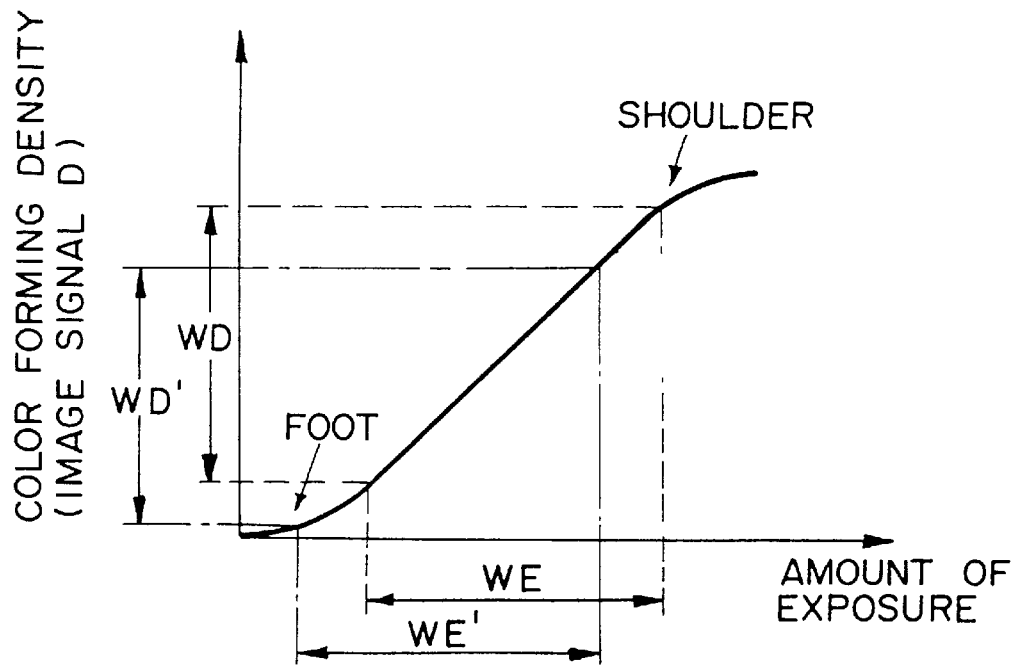

In order to prevent such a problem, the input image signal D is converted to the output image signal Do according to the nonlinear characteristics shown in FIG. 2B which is inverse to the characteristics of the film 10 shown in FIG. 2B. However, it is difficult to determine the range of the image signal D to be input into the nonlinear characteristics. That is, in the case of an input image signal D obtained from a properly exposed film, the range of the image signal D to be input into the nonlinear characteristics should be set so that the minimum image signal level falls on a point at distance $\Delta$ from the origin, as indicated at WD in FIG. 2A. In the case of an input image signal D obtained from an underexposed film, the range of the image signal D to be input into the nonlinear characteristics should be set so that the minimum image signal level falls on a point at distance $\Delta'$ from the origin as indicated at WD' in FIG. 2A.

In the photographic printer of this example, the method of determining the exposure condition is applied in order to properly determine the range of the image signal D to be input into the nonlinear characteristics.

The image processing system 54 first creates a histogram of densities represented by image signal components of the image signal D, which is, for instance, as shown in FIG. 3. Then the first image processing system 54 obtains the densities Dmin and Dmax at points where the signal level of the image signal D is minimized (as a particular point) and maximized (as a particular point), and the dynamic range DR of the image signal D. The dynamic range DR can be obtained as the difference between the density Dmin and the density Dmax. Since Dmin may be considered to correspond to a shadow point, i.e., the darkest point in the image, the density Dmin will be referred to as "the shadow point density SD", hereinbelow.

As can be understood from the description above, the exposure condition of the film 10 can be determined based on the position where the shadow point density SD is on the vertical axis in FIG. 2B. The position of the shadow point density SD is obtained letting the position be replaced by x. For this purpose, the first image processing system 54 stores therein random functions such as that shown in FIGS. 4A and 4B.

Figure 4A:
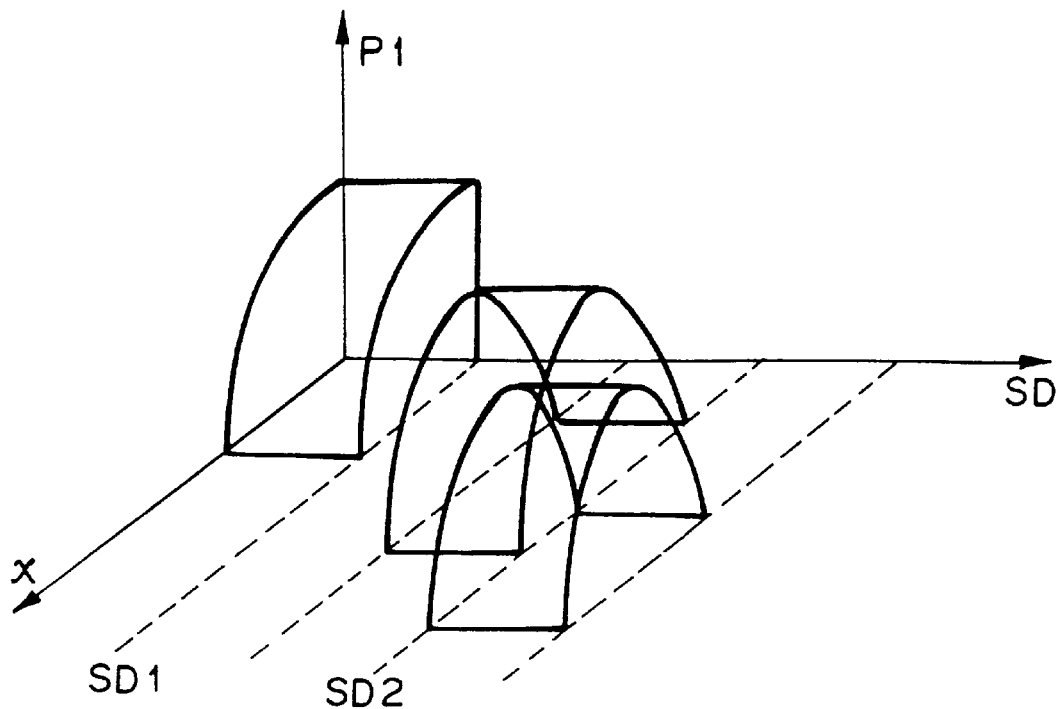
FIGS. 4A and 4B are graphs for illustrating random functions which are employed for determination of the exposure condition in the photographic printer.

The random function shown in FIG. 4A is a function which defines probability P1 of the position x which the shadow point density SD can take based on values of the shadow point density SD. The function is defined in three ranges. First, there is a probability that the shadow point density SD takes a relatively small value of x when the shadow point density SD is in the range smaller than a first predetermined density SD1. Second, there is a probability that the shadow point density SD takes a relatively large value of x when the shadow point density SD is in the range larger than a second predetermined density SD2. Third, and there is a probability that the shadow point density SD takes an intermediate value of x when the shadow point density SD is in the range between the first and second predetermined densities SD1 and SD2.

Figure 4B:
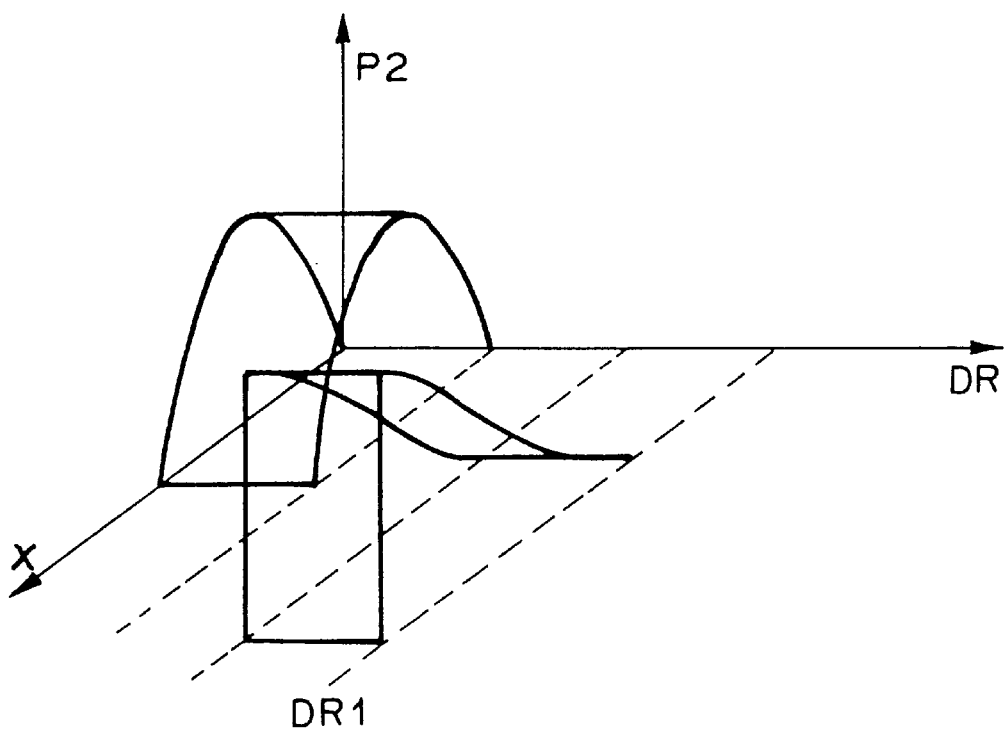

The random function shown in FIG. 4B is a function which defines probability P2 of the position x which the shadow point density SD can take based on values of the dynamic range DR. The function is defined so that there is a probability that the shadow point density SD takes a relatively small value of x or a relatively large value of x when the dynamic range DR is in the range smaller than a predetermined value DR1. The random function such as shown in FIGS. 4A and 4B may be empirically defined by kind of film.

The first image processing system 54 obtains the shadow point density SD and the dynamic range DR in the manner described above and obtains the probabilities P1 of values of x based on the value of the shadow point density SD and the probabilities P2 of values of x based on the value of the dynamic range DR. Then the first image processing system 54 obtains the value of x which maximizes the product P(x) of the probabilities P1 and P2.

The value of x thus obtained is relatively small for an underexposed film and relatively large for an overexposed film. Accordingly, whether the film is underexposed or overexposed can be determined on the basis of the value of x. By defining the value of x based precisely on these calculations without change, alternatively, based on a value obtained by multiplying the value of x by an appropriate coefficient such as the distance between the point of the minimum image signal level and the origin in FIG. 2A, the distance becomes small as indicated at Δ' in the case of an underexposed film. The nonlinear conversion processing is therefore carried out to enhance the contrast in the low density region by increasing the distance, as indicated at Δ" in the case of an overexposed film. by contrast, the nonlinear conversion processing is carried out to enhance the contrast in the high density region by decreasing the distance indicated at "Δ" in the case of underexposed film. In the case of a properly exposed film, the distance becomes Δ and any density region is not enhanced.

In the embodiment described above, the shadow point is determined at a particular point on the histogram, and the shadow point density SD is compared with first and second predetermined densities SD1 and SD2 in order to determine whether the film is underexposed or overexposed. Other particular point on the histogram, such as, a highlight point for instance, may also or alternatively be employed as the particular point on the histogram.

What is claimed is:

1. A method of determining an exposure condition of a photographic material, comprising:

obtaining a density of a particular point of an image represented by an image signal generated based on the photographic material, and a dynamic range of the image signal;

determining that the photographic material was underexposed when the density of the particular point is smaller than a first determined density and, at the same time, that the dynamic range of the image signal is smaller than a predetermined value; and determining that the photographic material was overexposed when the density of the particular point is larger than a second predetermined density and, at the same time, that the dynamic range of the image signal is smaller than a predetermined value.

2. The method recited by claim 1, further comprising:

creating a histogram of densities represented by image signal components of the image signal obtained by reading out an image from the photographic material, wherein the density of the particular point is obtained based on the histogram.

3. A method of determining an exposure condition of a photographic material, comprising:

obtaining a density of a particular point of an image represented by an image signal generated based on the photographic material;

determining a dynamic range of the image signal; and determining underexposure and overexposure of the photographic material based on both the density of the particular point and the dynamic range of the image signal, wherein determining whether the photographic material is underexposed or overexposed comprises:

determining a probability of malexposure based on the density of the particular point; and determining whether the photographic material is underexposed or overexposed based on the probability of malexposure, and wherein the probability of malexposure is determined by applying the density of the particular point to a random function, where the random function is defined such that the probability has a small value when the density is smaller than a first predetermined density.

4. A method of determining an exposure condition of a photographic material, comprising:

obtaining a density of a particular point of an image represented by an image signal generated based on the photographic material;

determining a dynamic range of the image signal; and determining underexposure and overexposure of the photographic material based on both the density of the particular point and the dynamic range of the image signal, wherein determining whether the photographic material is underexposed or overexposed comprises:

determining a probability of malexposure based on the dynamic range of the image signal; and determining whether the photographic material is underexposed or overexposed based on the probability of malexposure, and wherein the probability of malexposure is determined by applying the dynamic range to a random function, where the random function is defined such that the second probability has a small value when the dynamic range is smaller than a predetermined value.

5. A method of determining an exposure condition of a photographic material, comprising:

obtaining a density of a particular point of an image represented by an image signal generated based on the photographic material;

determining a dynamic range of the image signal; and determining underexposure and overexposure of the photographic material based on both the density of the particular point and the dynamic range of the image signal, wherein determining the underexposure or overexposure of the photographic material comprises:

determining a first probability of malexposure based on the density of the particular point;

determining a second probability of malexposure based on the dynamic range of the image signal;

calculating a third probability of malexposure based on the first and second probabilities of malexposure; and determining the underexposure or overexposure of photographic material based on the third probability of malexposure.

6. The method recited by claim 5, wherein the third probability of malexposure is determined by multiplying the first and second probabilities of malexposure.

7. A method of determining an exposure condition of a photographic material, comprising:

obtaining a density of a particular point of an image represented by an image signal generated based on the photographic material;

determining a dynamic range of the image signal; and determining underexposure and overexposure of the photographic material based on both the density of the particular point and the dynamic range of the image signal, wherein determining the underexposure or overexposure of the photographic material comprises:

determining that the photographic material was underexposed when the density of the particular point is smaller than a first predetermined density and, at the same time, that the dynamic range of the image signal is smaller than a predetermined value; and determining that the photographic material was overexposed when the density of the particular point is larger than a second predetermined density and, at the same time, that the dynamic range of the image signal is smaller than a predetermined value.

8. An apparatus for determining an exposure condition of a photographic material, comprising:

a density measuring device for determining a density of a particular point of an image represented by an image signal generated based on the photographic material;

a dynamic range determining device for determining a dynamic range of the image signal; and an exposure condition determining device for determining whether the photographic material is underexposed or overexposed based on both the density of the particular point and the dynamic range of the image signal, wherein the exposure condition determining device comprises:

first means for determining a probability of malexposure based on the density of the particular point; and second means for determining the underexposure or overexposure of the photographic material based on the probability of malexposure, and wherein the first means includes means for determining probability of malexposure by applying the density of the particular point to a random function, where the random function is defined such that the probability has a small value when the density is smaller than a first predetermined density.

9. An apparatus for determining an exposure condition of a photographic material, comprising:

a density measuring device for determining a density of a particular point of an image represented by an image signal generated based on the photographic material;

a dynamic range determining device for determining a dynamic range of the image signal; and an exposure condition determining device for determining whether the photographic material is underexposed or overexposed based on both the density of the particular point and the dynamic range of the image signal, wherein the exposure condition determining device comprises:

first means for determining a probability of malexposure based on the dynamic range of the image signal; and second means for determining the underexposure and overexposure of the photographic material based on the probability of malexposure, and wherein the first means includes means for determining probability of malexposure by applying the dynamic range to a random function, where the random function is defined such that the second probability has a small value when the dynamic range is smaller than a predetermined value.

10. An apparatus for determining an exposure condition of a photographic material, comprising:

a density measuring device for determining a density of a particular point of an image represented by an image signal generated based on the photographic material;

a dynamic range determining device for determining a dynamic range of the image signal; and an exposure condition determining device for determining whether the photographic material is underexposed or overexposed based on both the density of the particular point and the dynamic range of the image signal, wherein the exposure condition determining device comprises:

means for determining a first probability of malexposure based on the density of the particular point;

means for determining a second probability of malexposure based on the dynamic range of the image signal;

means for calculating a third probability of malexposure based on the first and second probabilities of malexposure; and means for determining underexposure or overexposure of the photographic material based on the third probability of malexposure.

11. The method recited by claim 10, wherein means for calculating the third probability of malexposure includes means for multiplying the first and second probabilities of malexposure.

12. A method for determining an exposure condition of a photographic material, comprising:

a density measuring device for determining a density of a particular point of an image represented by an image signal generated based on the photographic material;

a dynamic range determining device for determining a dynamic range of the image signal; and an exposure condition determining device for determining whether the photographic material is underexposed or overexposed based on both the density of the particular point and the dynamic range of the image signal, wherein the exposure condition determining device comprises:

means for determining that the photographic material was underexposed when the density of the particular point is smaller than a first predetermined density and, at the same time, that the dynamic range of the image signal is smaller than a predetermined value; and means for determining that the photographic material was overexposed when the density of the particular point is larger than a second predetermined density and, at the same time, that the dynamic range of the image signal is smaller than a predetermined value.

* * * * *